C. MILLER.
CLAMPING DEVICE FOR LENS HOLDERS.
APPLICATION FILED JAN. 29, 1912.
1,042,023.
Patented Oct. 22, 1912.
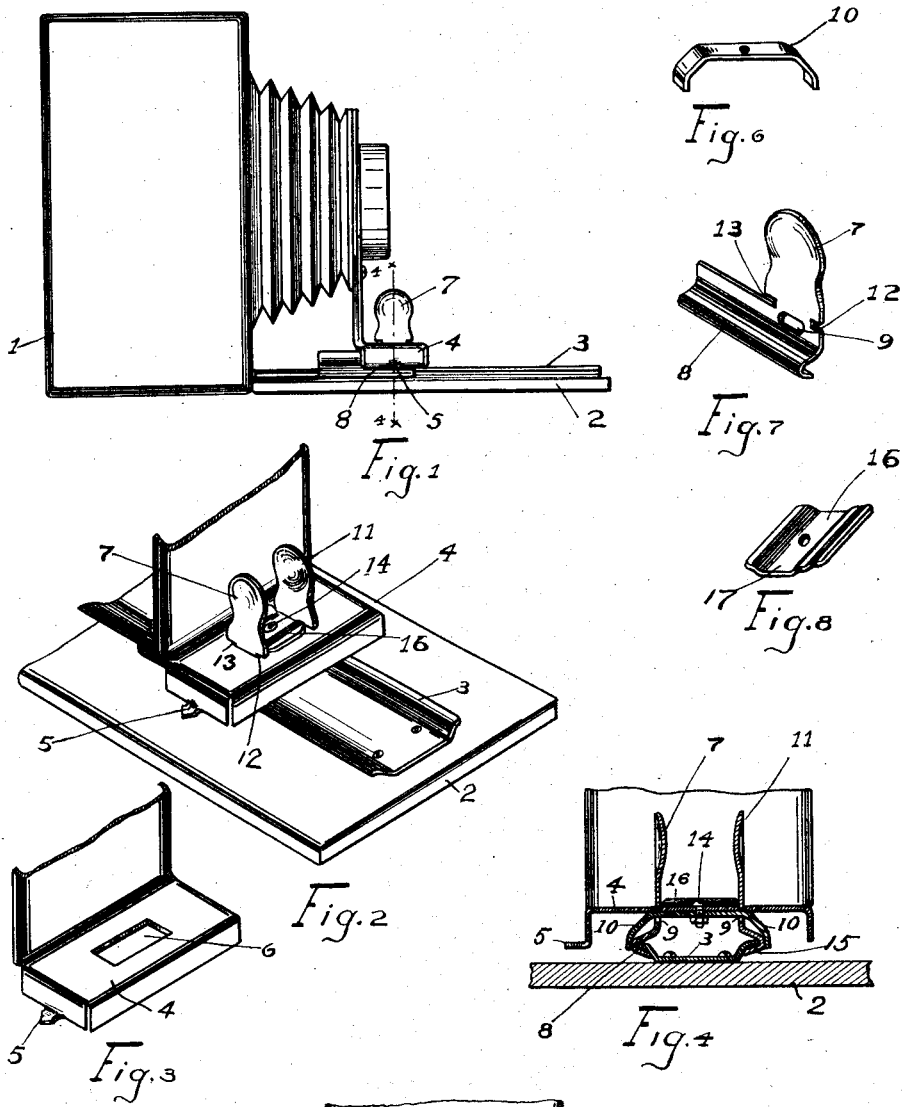
INVENTOR
Charles Miller
BY
Frank Keifer
ATTORNEY
WITNESSES

UNITED STATES PATENT OFFICE.

CHARLES MILLER, OF ROCHESTER, NEW YORK, ASSIGNOR TO GUNDLACH-MANHATTAN OPTICAL COMPANY, OF ROCHESTER, NEW YORK, A CORPORATION OF NEW YORK.

CLAMPING DEVICE FOR LENS-HOLDERS.

1,042,023. Specification of Letters Patent. Patented Oct. 22, 1912.

Application filed January 29, 1912. Serial No. 674,133.

*To all whom it may concern:*

Be it known that I, CHARLES MILLER, a citizen of the United States, residing at Rochester, in the county of Monroe and State of New York, have invented certain new and useful Improvements in Clamping Devices for Lens-Holders, of which the following is a specification.

The object of my invention is to provide an improved clamping device for the lens holder or carrier of a camera, the device being intended to clamp the lens holder at any point to the run-way or guide such as is usually carried on the hinged front of the ordinary hand camera, permitting easy adjustment and accurate focusing of the lens.

The device is also one that can be cheaply manufactured and is simple and effective in its operation.

In the accompanying drawings which illustrate my invention Figure 1 is a side elevation of an open hand camera with my improved clamping device used as parts thereof. Fig. 2 is a perspective detail view of the clamping device. Fig. 3 is a detail perspective view of the frame on which the clamping device is mounted. Fig. 4 is a vertical section taken on the line 4$^x$—4$^x$ of Fig. 1. Fig. 5 is a similar section with the parts shown in the position which they assume when the clamp is released. Fig. 6 is a perspective view of the spring used for pressing the clamping fingers against the guide-way. Fig. 7 is a perspective view of one of the clamping fingers. Fig. 8 is a perspective view of the plate which fills the opening in the frame through which the levers or the finger pieces of the clamping device are inserted.

In the accompanying drawings like reference numerals refer to like parts.

In the drawings, reference numeral 1 indicates the box of an ordinary hand camera to which the lid 2 is pivotally connected. When this lid is opened to the position shown in Fig. 1, it forms the bed for supporting the lens front of the camera. On this bed is rigidly fastened the guide or run-way 3. Mounted to travel on this run-way is the frame 4 on which is carried the lens of the camera and to which is attached the bellows of the camera. On this frame 4 is provided a pointer 5 such as is ordinarily used for pointing to the graduated index focusing scale, such as is ordinarily provided on the beds of cameras. The bed 4 is perforated with a rectangular opening as indicated by 6 in Fig. 3. In this rectangular opening is inserted from below, the levers or finger pieces 7 and 11, one of which is illustrated in Fig. 7 and the other of which is formed symmetrically opposite thereto. These finger pieces have the elongated runners 8 and 15 respectively thereon which engage with the guide or runway 3 and along which it travels. The runner is perforated at 9, permitting the insertion of the spring 10 thereto.

The parts are assembled as follows: First the levers 7 and 11 are inserted in the rectangular opening 6, for which purpose they must first be turned parallel to said opening until the recesses 12 and 13 are in line with the plate surrounding said opening, after which the levers are turned transverse to said opening, the recesses serving to lock the levers in place. The lever is made wider than the opening in the plate so as to bear upon said plate both above and below and the recesses 12 and 13 are wide enough to give ample clearance between them and the plate. When the levers are in position in the frame, they can be moved together to the middle of the frame and the spring 10 is then inserted through the openings 9 in the two levers, after which the levers are spread apart to the position shown in Figs. 2, 4 and 5 and the plate 16 is placed between them for the purpose of holding the levers apart. The spring 10 is perforated at the center and a screw bolt 14 is used for holding the plate 16 and the spring together in place. The plate 16 has a bent portion 17 which is adapted to engage the rectangular opening 6 of the frame 4 and cause the plate and spring to be positively held in place.

The ends of the spring 10 engage with the outside of the runners 8 and 15 and move them in toward each other. After the parts have been assembled in this way, the frame can be placed upon the guide or runway. The levers 7 and 11 are first pressed in toward each other at the top causing them to rotate around the edges of the spacing plate 16 as a center, spreading them apart at the bottom against the resistance of the spring 10. The runners 8 and 15 are then slipped over the edges of the runway or guide 3 and moved to any desired point thereon. When the levers 7 and 11 are released by the hand of the operator, the spring 10 operates to press the runners 8 and 15 against the edges of the runway, securely holding the frame in any position in which it may be put. The levers 7 and 11 are not fulcrumed in the plate of the base 4 as it will be apparent that the plate 4 may be cut away, making the rectangular slot 6 of any desired length that does not impair the strength of the base.

It is obvious that numerous changes may be made in my invention without departing from the spirit of it or impairing the efficiency of the structure which may contain it, as for example, the runners 8 and 15 may be formed as a part of the spring 10, which will normally clamp the runway and the levers 7 and 11 may loosely engage with the spring for the purpose of spreading it or the levers may be loosely held between offset portions of the spring and the runway permitting the spring to directly and tightly clamp the runway and still be easily released by the levers 7 and 11.

Having thus described my invention, what I claim as new and patentable is as follows:

1. In a camera, the combination of a base supporting a lens front and a guide along which said base is adapted to travel, means for clamping said base adjustably on said guide, said means comprising a pair of runners, one engaging on each side of said guide, a spring embracing the outside of said runners and pressing them toward each other and against the guide.

2. In a camera the combination of a base supporting a lens front and a guide along which said base is adapted to travel, means for clamping said base adjustably on said guide, said means comprising a pair of runners, one engaging on each side of said guide, a spring embracing the outside of said runners and pressing them toward each other and against the guide, levers connected to said runners and extending upwardly through said base.

3. The combination in a camera of a base supporting a lens front, said base having a rectangular slot therein, levers extending through said slot, said levers having the recesses in the sides thereof, with which said levers are adapted to positively engage with the long sides of said slot, a plate nested in said slot between said levers, a spring connected to said plate and pressing said levers against said plate.

4. The combination in a camera of a base supporting a lens front, a rectangular slot in said base having a rectangular slot therein, levers extending through said slot, said levers having the recesses in the sides thereof, with which said levers are adapted to positively engage with the long sides of said slot, a plate nested in said slot between said levers, a spring passing through said levers and pressing said levers against said plate.

In testimony whereof I affix my signature in presence of two witnesses.

CHARLES MILLER.

Witnesses:
HENRY N. TURNER,
LENA M. ASH.

Copies of this patent may be obtained for five cents each, by addressing the "Commissioner of Patents, Washington, D. C."